United States Patent
Hori et al.

(10) Patent No.: US 12,193,098 B2
(45) Date of Patent: *Jan. 7, 2025

(54) RADIO BEARER ESTABLISHMENT IN WIRELESS COMMUNICATION NETWORKS

(71) Applicant: Sharp Kabushiki Kaisha, Sakai (JP)

(72) Inventors: Takako Hori, Sakai (JP); Shohei Yamada, Sakai (JP); Hidekazu Tsuboi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,077

(22) Filed: Feb. 12, 2024

(65) Prior Publication Data

US 2024/0188171 A1    Jun. 6, 2024

Related U.S. Application Data

(63) Continuation of application No. 16/763,322, filed as application No. PCT/JP2018/041736 on Nov. 9, 2018, now Pat. No. 11,910,464.

(30) Foreign Application Priority Data

Nov. 15, 2017 (JP) ................................ 2017-219899

(51) Int. Cl.
*H04W 76/22* (2018.01)
*H04W 72/20* (2023.01)
*H04W 76/11* (2018.01)

(52) U.S. Cl.
CPC .......... *H04W 76/22* (2018.02); *H04W 72/20* (2023.01); *H04W 76/11* (2018.02)

(58) Field of Classification Search
CPC . H04W 76/22; H04W 76/11; H04W 72/0406; H04W 76/021; H04W 76/15; H04W 52/04; H04W 52/146; H04W 52/36; H04W 52/40; H04W 72/0473; H04W 72/1247; H04W 72/1284; H04W 74/004;
(Continued)

(56) References Cited

U.S. PATENT DOCUMENTS

2021/0298120 A1* 9/2021 Sharma ................. H04W 12/04

OTHER PUBLICATIONS

Hori et al., "Radio Bearer Establishment in Wireless Communication Networks", U.S. Appl. No. 16/763,322, filed May 12, 2020.

* cited by examiner

*Primary Examiner* — Rushil P. Sampat
(74) *Attorney, Agent, or Firm* — Keating & Bennett, LLP (57) ABSTRACT

A terminal apparatus that communicates with one or multiple base station apparatuses includes: a receiver configured to receive an RRC connection reconfiguration message including a DRB configuration from a base station apparatus of the one or multiple base station apparatuses; and a processing unit configured to associate an DRB that is established with an EPS bearer identity included in information of a DRB configuration in a case that information indicating that a full configuration is applied is included in the RRC connection reconfiguration message received by the receiver, a DRB identity included in the information of the DRB configuration is not present in a part of a current configuration of the terminal apparatus, and an LTE PDCP entity is established in the DRB that is established and has the DRB identity.

4 Claims, 8 Drawing Sheets

(58) Field of Classification Search
CPC ... H04W 74/006; H04W 76/27; H04W 88/10; H04W 92/20
See application file for complete search history.

```
<OMITTED>
fullConfig            ENUMERATED {true}                            OPTIONAL,
  <PARTLY OMITTED>
DRB-ToAddModList ::= SEQUENCE (size (1..maxQoSFlowID)) OF DRB-ToAddMod
DRB-ToAddMod ::= SEQUENCE {
  <PARTLY OMITTED>
  eps-BearerIdentity       INTEGER (0..15)                         OPTIONAL,
  drb-Identity             DRB-Identity                            OPTIONAL,
  pdcp-Config              PDCP-Config                             OPTIONAL,
  <PARTLY OMITTED>
}
  <PARTLY OMITTED>
DRB-Identity ::=           INTEGER (1..32)
  <OMITTED>
```

RADIO BEARER ESTABLISHMENT IN WIRELESS COMMUNICATION NETWORKS

TECHNICAL FIELD

The present invention relates to a terminal apparatus, a base station apparatus, and a method.

BACKGROUND ART

A radio access method and a radio network for cellular mobile communications (which will hereinafter be referred to as "Long Term Evolution (LTE; trade name)" or "Evolved Universal Terrestrial Radio Access (E-UTRA)") and a core network (which will be referred to as "Evolved Packet Core or EPC") have been studied by the 3rd Generation Partnership Project (3GPP).

Furthermore, as a radio access method and a radio network technology for a 5th generation cellular system, technical studies and standardization of LTE-Advanced Pro which is an enhanced technology of LTE and New Radio technology (NR) which is a new radio access technology have been conducted by the 3GPP (NPL 1). Furthermore, 5 Generation Core Network (5GC), which is a core network for the 5th generation cellular system, has also been studied (NPL 2).

CITATION LIST

Non Patent Literature

NPL 1: 3GPP RP-170855, "Work Item on New Radio (NR) Access Technology"
NPL 2: 3GPP TS 23.501, "System Architecture for the 5G System; Stage 2"
NPL 3: 3GPP TS 36.300, "Evolved Universal Terrestrial Radio Access (E-UTRA) and Evolved Universal Terrestrial Radio Access Network (E-UTRAN); Overall description; Stage 2"
NPL 4: 3GPP TS 36.331, "Evolved Universal Terrestrial Radio Access (E-UTRA); Radio Resource Control (RRC); Protocol specifications"
NPL 5: 3GPP TS 36.323, "Evolved Universal Terrestrial Radio Access (E-UTRA); Packet Data Convergence Protocol (PDCP) specification"
NPL 6: 3GPP TS 36.322, "Evolved Universal Terrestrial Radio Access (E-UTRA); Radio Link Control (RLC) protocol specification"
NPL 7: 3GPP TS 36.321, "Evolved Universal Terrestrial Radio Access (E-UTRA); Medium Access Control (MAC) protocol specification"
NPL 8: 3GPP TS 37.340, "Evolved Universal Terrestrial Radio Access (E-UTRA) and NR; Multi-Connectivity; Stage 2"
NPL 9: 3GPP TS 38.300, "NR; NR and NG-RAN Overall description; Stage 2"
NPL 10: 3GPP TS 38.331, "NR; Radio Resource Control (RRC); Protocol specifications"
NPL 11: 3GPP TS 38.323, "NR; Packet Data Convergence Protocol (PDCP) specification"
NPL 12: 3GPP TS 38.322, "NR; Radio Link Control (RLC) protocol specification"
NPL 13: 3GPP TS 38.321, "NR; Medium Access Control (MAC) protocol specification"
NPL 14: 3GPP TS 23.401 v14.3.0, "General Packet Radio Service (GPRS) enhancements for Evolved Universal Terrestrial Radio Access Network (E-UTRAN) access"
NPL 15: 3GPP TS 23.502, "Procedure for 5G System; Stage 2"
NPL 16: 3GPP TS 37.324, "NR; Service Data Adaptation Protocol (SDAP) Specification"

SUMMARY OF INVENTION

Technical Problem

As one of the technical studies of NR, a mechanism called Multi-RAT Dual Connectivity (MR-DC) is being studied that allows cells of radio access technologies (RATs) of both E-UTRA and NR to be grouped into a cell group on a RAT basis and to be allocated to UE such that a terminal apparatus communicates with one or more base station apparatuses (NPL 8).

However, since the formats and functions of the communication protocols used in the E-UTRA and the NR differ, there is a problem in that the protocol processing becomes complex compared to Dual Connectivity in existing LTE using only E-UTRA as a RAT, and thus a base station apparatus and a terminal apparatus are not able to efficiently communicate with each other.

One aspect of the present invention is realized with the situations described above taken into account, and one object thereof is to provide a terminal apparatus capable of efficiently communicating with a base station apparatus, a base station apparatus communicating with the terminal apparatus, a method used for the terminal apparatus, a method used for the base station apparatus, and an integrated circuit mounted in the terminal apparatus.

Solution to Problem

In order to accomplish the object described above, an aspect of the present invention is contrived to provide the following means. One aspect of the present invention is a terminal apparatus that communicates with one or multiple base station apparatuses, the terminal apparatus including: a receiver configured to receive a Radio Resource Control (RRC) connection reconfiguration message including a Data Radio Bearer (DRB) configuration from a base station apparatus of the one or multiple base station apparatuses; and a processing unit configured to notify a higher layer of information indicating that a DRB having a DRB identity is established and an EPS bearer identity of the DRB established, based on the fact that the DRB identity included in the DRB configuration is not configured in the terminal apparatus, and an Evolved Universal Terrestrial Radio Access (E-UTRA) Packet Data Convergence Protocol (PDCP) entity configuration is included in the DRB configuration.

One aspect of the present invention is a base station apparatus that communicates with a terminal apparatus, the base station apparatus including: a generation unit configured to generate a Radio Resource Control (RRC) connection reconfiguration message including a Data Radio Bearer (DRB) configuration; and a transmitter configured to transmit the RRC connection reconfiguration message to the terminal apparatus, in which the RRC connection reconfiguration message is a message that causes the terminal apparatus to notify, from a lower layer to a higher layer, information indicating that a DRB having a DRB identity is established, and an EPS bearer identity of the DRB established, based on the fact that the DRB identity included in the DRB configuration is not configured in the terminal apparatus, and an Evolved Universal Terrestrial Radio Access (E-UTRA) Packet Data Convergence Protocol (PDCP) entity configuration is included in the DRB configuration.

An aspect of the present invention is a method performed by a terminal apparatus that communicates with one or multiple base station apparatuses, the method including: receiving a Radio Resource Control (RRC) connection reconfiguration message including a Data Radio Bearer (DRB) configuration from a base station apparatus of the one or multiple base station apparatuses; and notifying a higher layer of information indicating that a DRB having a DRB identity is established and an EPS bearer identity of the DRB established, based on the fact that the DRB identity included in the DRB configuration is not configured in the terminal apparatus, and an Evolved Universal Terrestrial Radio Access (E-UTRA) Packet Data Convergence Protocol (PDCP) entity configuration is included in the DRB configuration.

An aspect of the present invention is a method performed by a base station apparatus that communicates with a terminal apparatus, the method including: generating a Radio Resource Control (RRC) connection reconfiguration message including a Data Radio Bearer (DRB) configuration; and transmitting the RRC connection reconfiguration message to the terminal apparatus, in which the RRC connection reconfiguration message is a message that causes the terminal apparatus to notify, from a lower layer to a higher layer, information indicating that a DRB having a DRB identity is established, and an EPS bearer identity of the DRB established, based on the fact that the DRB identity included in the DRB configuration is not configured in the terminal apparatus, and an Evolved Universal Terrestrial Radio Access (E-UTRA) Packet Data Convergence Protocol (PDCP) entity configuration is included in the DRB configuration.

Advantageous Effects of Invention

According to one aspect of the present invention, a terminal apparatus can efficiently perform communication by reducing complexity of protocol processing.

DESCRIPTION OF EMBODIMENTS

Hereinafter, an embodiment of the present invention will be described in detail with reference to the drawings.

LTE (and LTE-A Pro) and NR may be defined as different RATs. The NR may be defined as a technology included in the LTE. The LTE may be defined as a technology included in the NR. In addition, the LTE that is connectable to the NR using Multi RAT Dual connectivity may be distinguished from the existing LTE. The present embodiment may be applied to the NR, the LTE and other RATs. Terms associated with the LTE and the NR are used in the following description. However, the present invention may be applied to other technologies using other terms. In this embodiment, the term "E-UTRA" may be replaced with "LTE," and the term "LTE" may be replaced with "E-UTRA".

Figure 1:
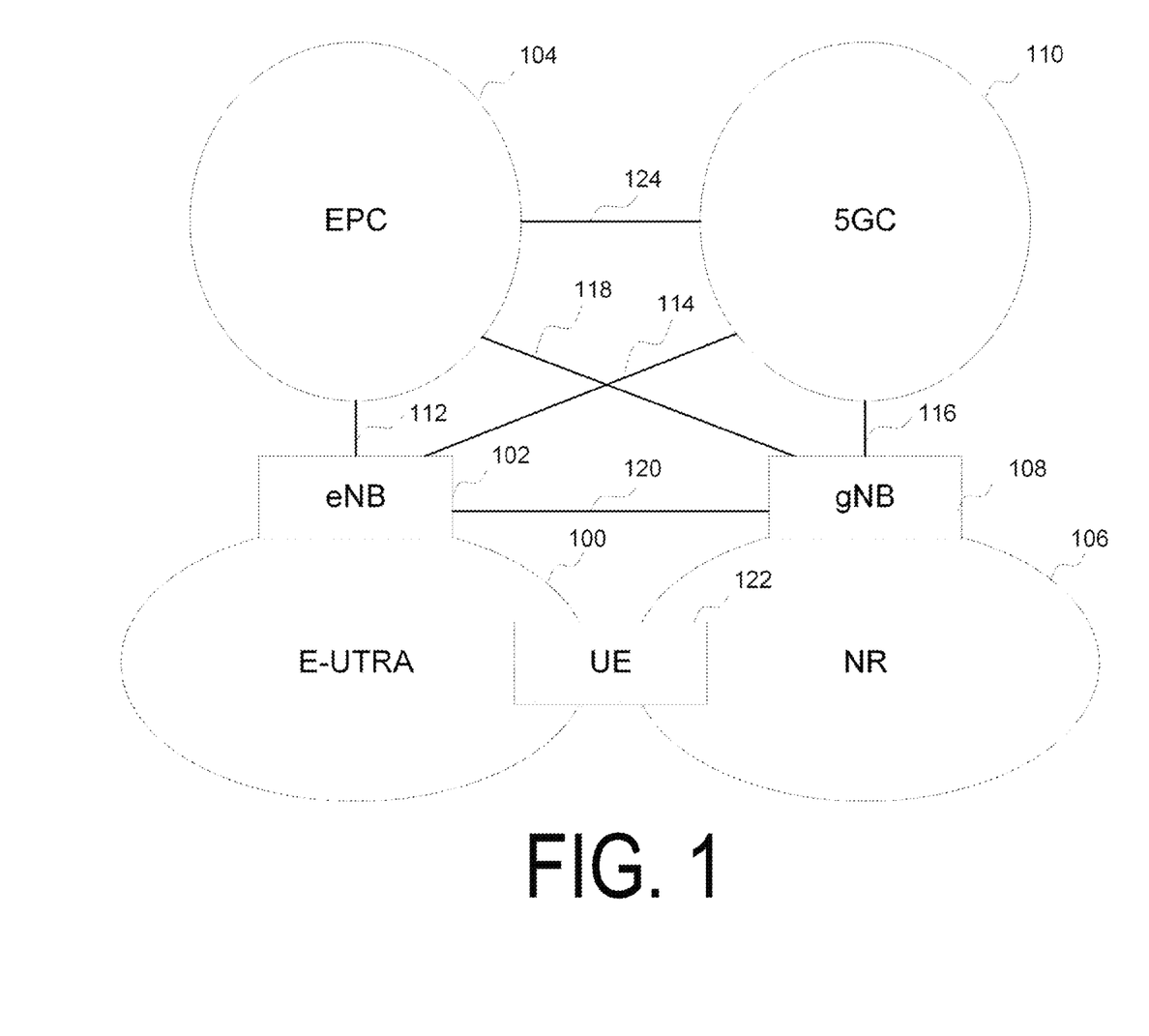
FIG. 1 is a schematic diagram of a communication system according to an embodiment of the present invention.

FIG. 1 is a schematic diagram of a communication system according to an embodiment of the present invention.

An E-UTRA 100 is a radio access technology described in NPL 3 or the like, and includes a cell group (CG) configured in one or multiple frequency bands. An E-UTRAN Node B (eNB) 102 is a base station apparatus of the E-UTRA. An Evolved Packet Core (EPC) 104 is a core network described in NPL 14 or the like and is designed as a core network for the E-UTRA. An interface 112 is an interface between the eNB 102 and the EPC 104, where there is a control plane (CP) through which control signals are transferred and a user plane (UP) through which user data is transferred.

A NR 106 is a new radio access technology that is currently being studied by the 3GPP and includes cell groups (CGs) that are configured in one or multiple frequency bands. A gNode B (gNB) 108 is an NR base station apparatus. A 5GC 110 is a new core network for the NR that is currently being studied by 3GPP, and is described in NPL 2 and the like.

An interface 114 is an interface between the eNB 102 and the 5GC 110, an interface 116 is an interface between the gNB 108 and the 5GC 110, an interface 118 is an interface between the gNB 108 and the EPC 104, an interface 120 is an interface between the eNB 102 and the gNB 108, and an interface 124 is an interface between the EPC 104 and 5GC 110. The interface 114, the interface 116, the interface 118, the interface 120, and the interface 124 are interfaces that transfer CP only, UP only, or both the CP and the UP, and details are being discussed by 3GPP. Furthermore, the interface 114, the interface 116, the interface 118, the interface 120, and the interface 124 may not exist depending on communication systems provided by network operators.

A UE 122 is a terminal apparatus supporting the NR or both the E-UTRA and the NR.

Figure 2:
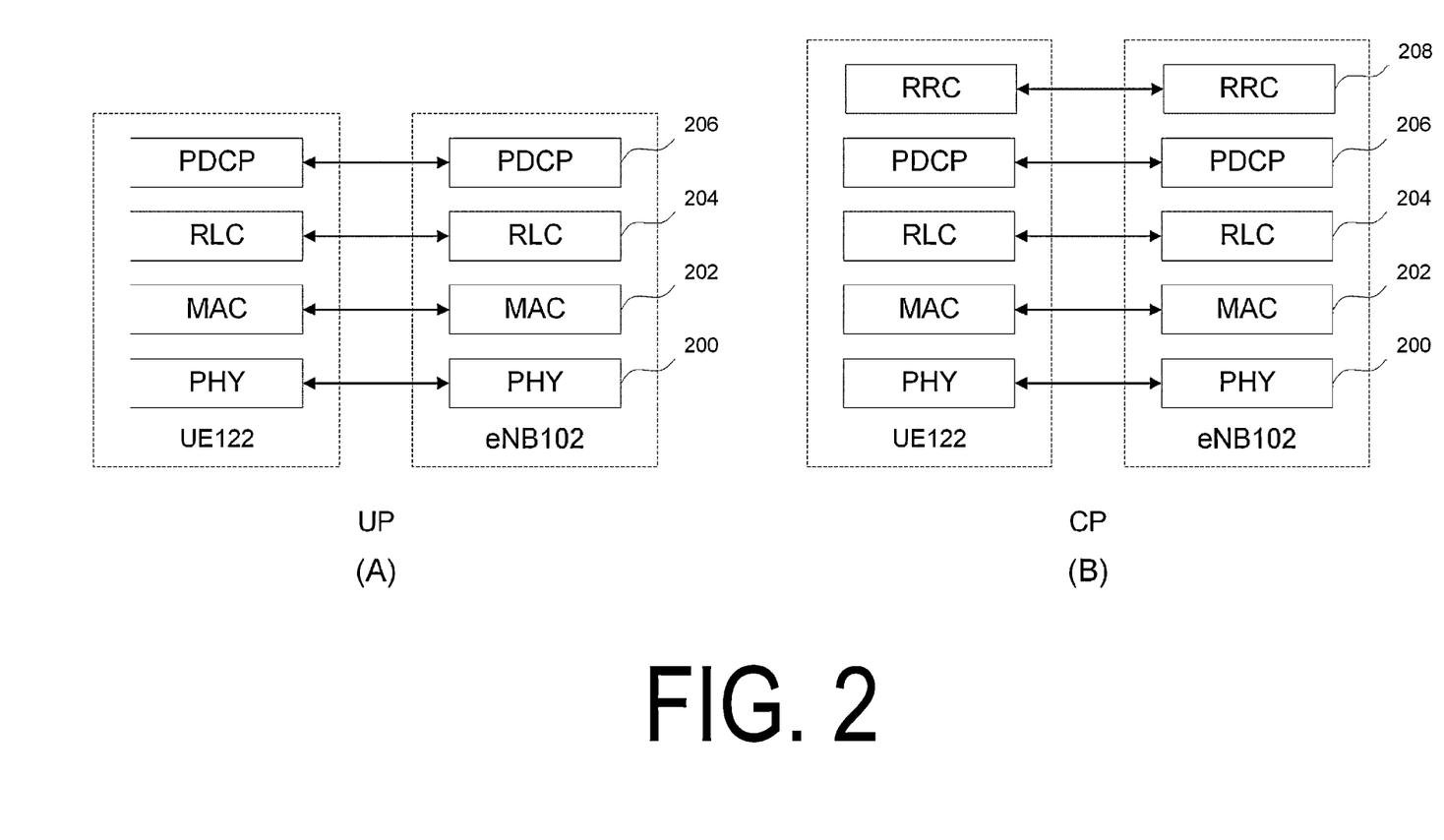
FIG. 2 is a diagram of protocol stacks of UP and CP of a terminal apparatus and a base station apparatus in E-UTRA according to an embodiment of the present invention.

FIG. 2 is a diagram of protocol stacks of UP and CP of a terminal apparatus and a base station apparatus in an E-UTRA radio access layer according to an embodiment of the present invention.

FIG. 2(A) is a diagram of the protocol stack of the UP used in a case that the UE 122 communicates with the eNB 102.

A physical layer (PHY) 200 is a radio physical layer for providing a transmission service to a higher layer by using a physical channel. The PHY 200 is connected with a Medium Access Control layer (MAC) 202 of a higher layer to be described below via transport channels. Data is exchanged between the MAC 202 and the PHY 200 via the transport channels. The data is transmitted and/or received via radio physical channels between the PHYs of the UE 122 and the eNB 102.

The MAC 202 maps various logical channels to various transport channels. The MAC 202 is connected with a radio link control layer (RLC) 204 of a higher layer to be described below via logical channels. The major classifications of the logical channel depend on the type of information to be transmitted, specifically, the logical channels are classified into control channels for transmitting control information and traffic channels for transmitting user information. The MAC 202 has a function of controlling the PHY 200 in order to perform the Discontinuous Reception and Transmission (DRX and DTX), a function of performing a random access procedure, a function of reporting transmit power information, a function of performing HARQ control, and the like (NPL 7).

An RLC 204 divides (Segmentation) the data received from a Packet Data Convergence Protocol Layer (PDCP) 206 of a higher layer to be described below, and adjusts the data size such that a lower layer can properly perform data transmission. Furthermore, the RLC 200 also has a function of ensuring Quality of Service (QOS) required for each piece of data. In other words, the RLC 204 has a function of data retransmission control or the like (NPL 6).

A PDCP 206 may have a header compression function of compressing unnecessary control information in order to efficiently transmit an IP packet, which is user data, in a radio segment. Furthermore, the PDCP 206 may also have a data encryption function (NPL 5).

Note that data processed in the MAC 202, the RLC 204, and the PDCP 206 are referred to as a MAC Protocol Data Unit (PDU), an RLC PDU, and a PDCP PDU, respectively. In addition, data delivered from a higher layer to the MAC 202, the RLC 204, and the PDCP 206 or data delivered therefrom to a higher layer are respectively referred to as a MAC Service Data Unit (SDU), an RLC SDU, and a PDCP SDU.

FIG. 2(B) is a diagram of the protocol stack of the CP used in a case that the UE 122 communicates with the eNB 102.

In addition to the PHY 200, the MAC 202, the RLC 204, and the PDCP 206, there is a Radio Resource Control layer (RRC) 208 in the protocol stack of the CP. The RRC 208 controls logical channels, transport channels, and physical channels by configuring and reconfiguring Radio Bearers (RBs) and the like. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured in the RRCs 208 of the eNB 102 and the UE 122 (NPL 4).

The functional classification of the MAC 202, the RLC 204, the PDCP 206, and the RRC 208 described above is an example, and some or all of the respective functions may not be implemented. Some or all of the functions of each layer may be included in another layer.

Figure 3:
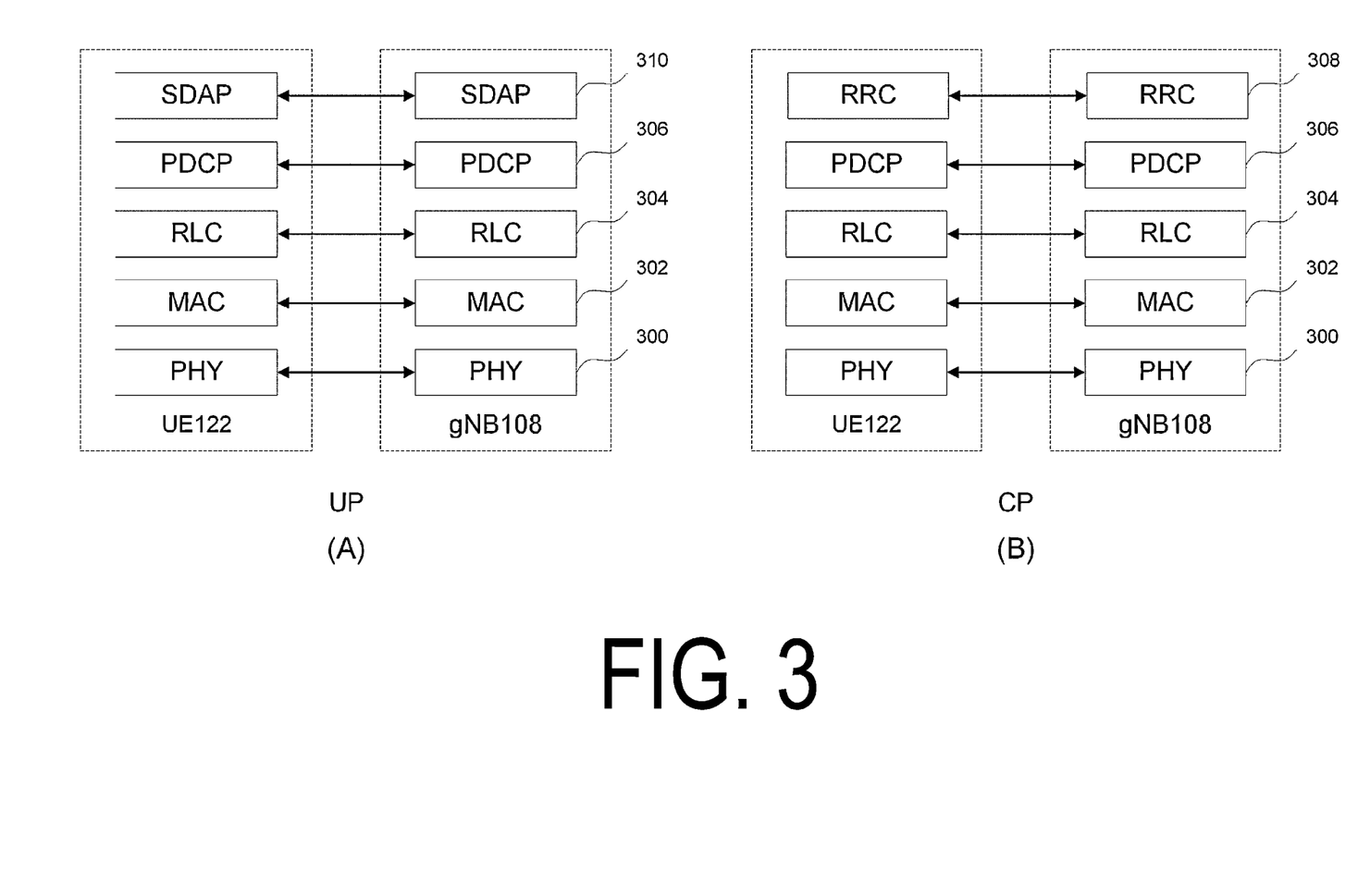
FIG. 3 is a diagram of protocol stacks of UP and CP of a terminal apparatus and a base station apparatus in NR according to an embodiment of the present invention.

FIG. 3 is a diagram of protocol stacks of UP and CP of a terminal apparatus and a base station apparatus in an NR radio access layer according to an embodiment of the present invention.

FIG. 3(A) is a diagram of the protocol stack of the UP used in a case that the UE 122 communicates with the gNB 108.

A physical layer (PHY) 300 is a radio physical layer of the NR and may provide a transmission service to a higher layer by using the physical channel. The PHY 300 may be connected with the Medium Access Control layer (MAC) 302 of a higher layer to be described below via the transport channels. Data may be exchanged between the MAC 302 and the PHY 300 via the transport channels. The data may be transmitted and/or received between the PHYs of the UE 122 and the gNB 108 via the radio physical channel. Details of the PHY 300 are different from those of the radio physical layer PHY 200 of E-UTRA and are under discussion by 3GPP.

The MAC 302 may map various logical channels to various transport channels. The MAC 302 may be connected with a Radio Link Control layer (RLC) 304 of is a high layer to be described below via the logical channels. The classification of the logical channel depends on the type of information to be transmitted, and the logical channels may be classified into the control channels for transmitting the control information and the traffic channels for transmitting the user information. The MAC 302 has a function of controlling the PHY 300 in order to perform the Discontinuous Reception and Transmission (DRX and DTX), a function of performing the random access procedure, a function of reporting the transmit power information, a function of performing the HARQ control, and the like (NPL 13). Details of the MAC 302 are different from those of the MAC 202 of the E-UTRA, and are under discussion by 3GPP.

The RLC 304 may divide (Segmentation) the data received from the Packet Data Convergence Protocol Layer (PDCP) 206 of a higher layer to be described below, and adjust the data size such that the lower layer can properly perform data transmission. Furthermore, the RLC 304 may also have a function of ensuring Quality of Service (QOS) required for each piece of data. In other words, the RLC 304 may have a function of data retransmission control or the like (NPL 12). Details of the RLC 304 are different from those of the RLC 204 of the E-UTRA, and are under discussion by 3GPP.

A PDCP 306 may have a header compression function of compressing unnecessary control information in order to efficiently transmit an IP packet, which is the user data, in a radio segment. Furthermore, the PDCP 306 may also have a data encryption function (NPL 11). Details of the PDCP 306 are different from those of the PDCP 206 of the E-UTRA, and are under discussion by 3GPP.

A Service Data Adaptation Protocol (SDAP) 310 may have a function of mapping a QoS flow of a downlink transmitted from a core network to a terminal apparatus through a base station apparatus and a DRB, mapping a QoS information flow of an uplink transmitted from the terminal apparatus to the core network through the base station apparatus and the DRB, and storing mapping rule information (NPL 16). The QoS flow includes one or multiple service data flows (SDFs) processed using the same QoS policy (NPL 2). In addition, the SDAP may have a Reflective QoS function of mapping the QoS flow of the uplink and the DRB based on information of the QoS flow of the downlink (NPL 2 and NPL 16). Details are under discussion by 3GPP.

In addition, an IP layer and a Transmission Control Protocol (TCP) layer, a User Datagram Protocol (UDP) layer, an application layer, and the like that are higher layers than the IP layer are higher layers than the SDAP (not illustrated). In addition, in the SDAP of the terminal apparatus, a layer for mapping the service data flow and the QoS flow is also a higher layer than the SDAP.

Note that the data processed in the MAC 302, the RLC 304, the PDCP 306, and the SDAP 310 may be referred to as a MAC Protocol Data Unit (PDU), an RLC PDU, a PDCP PDU, and an SDAP PDU, respectively. In addition, the data delivered from higher layers to the MAC 202, the RLC 204, and the PDCP 206 or data delivered to higher layers therefrom may be respectively referred to as a MAC Service Data Unit (SDU), an RLC SDU, a PDCP SDU, and an SDAP SDU.

FIG. 3(B) is a diagram of the protocol stack of the CP used in a case that the UE 122 communicates with the gNB 108.

In addition to the PHY 300, the MAC 302, the RLC 304, and the PDCP 306, there is a Radio Resource Control layer (RRC) 308 in the protocol stack of the CP. The RRC 308 may control logical channels, transport channels, and physical channels by configuring and reconfiguring Radio Bearers (RBs). The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured between RRCs 308 of the gNB 108 and the UE 122 (NPL 10).

The functional classification of the MAC 302, the RLC 304, the PDCP 306, the SDAP 310, and the RRC 308 described above is an example, and some or all of the functions may not be implemented. Some or all of the functions of each layer may be included in another layer.

Hereinafter, in an embodiment of the present invention, in order to distinguish an E-UTRA protocol and an NR protocol from each other, the MAC 202, the RLC 204, the PDCP 206, and the RRC 208 may be respectively referred to as a MAC for E-UTRA or a MAC for LTE, an RLC for E-UTRA or an RLC for LTE, a PDCP for E-UTRA or a PDCP for LTE, and an RRC for E-UTRA or an RRC for LTE. Furthermore, the MAC 302, the RLC 304, the PDCP 306, and the RRC 308 may also be referred to as MAC for NR, RLC for NR, RLC for NR, and RRC for NR, respectively. Alternatively, there may be descriptions using a space such as an E-UTRA PDCP or an LTE PDCP, an NR PDCP, and the like.

As also illustrated in FIG. 1, the eNB 102, the gNB 108, the EPC 104, and the 5GC 110 may be connected to one another via the interface 112, the interface 116, the interface 118, the interface 120, and the interface 114. Thus, the RRC 208 in FIG. 2 may be replaced with the RRC 308 in FIG. 3 to support various communication systems. Furthermore, the PDCP 206 in FIG. 2 may also be replaced with the PDCP 306 in FIG. 3. Furthermore, the RRC 308 in FIG. 3 may include the function of the RRC 208 in FIG. 2. Furthermore, the PDCP 306 in FIG. 3 may be the PDCP 206 in FIG. 2.

Embodiment

An embodiment of the present invention will be described with reference to FIG. 1, FIG. 2, and FIGS. 4 to 8.

Figure 4:
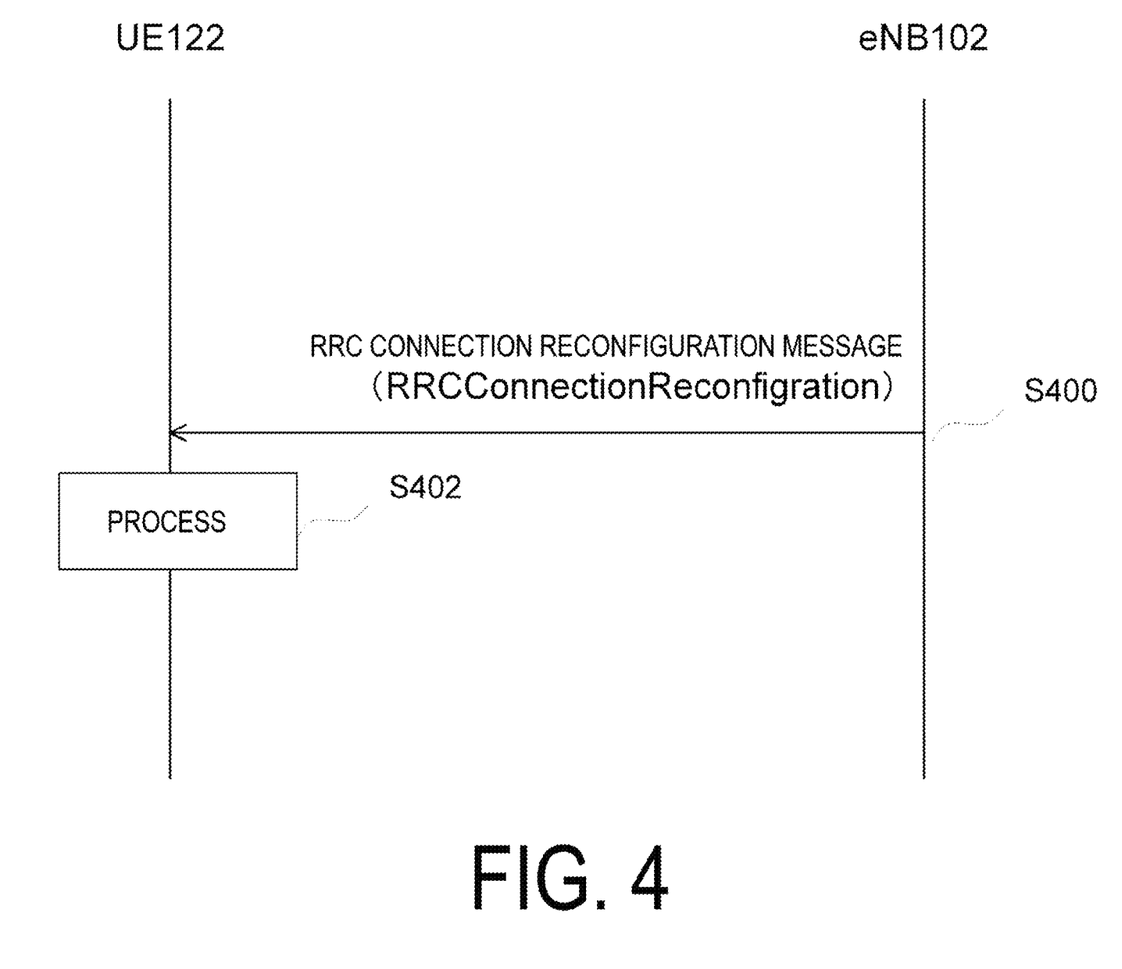
FIG. 4 is a diagram illustrating an example flow of an RRC connection reconfiguration procedure according to an embodiment of the present invention.

FIG. 4 is a diagram illustrating an example flow of an RRC connection reconfiguration procedure according to each embodiment of the present invention.

The RRC connection reconfiguration procedure (RRC Connection Reconfiguration) is a procedure used for handover, measurement, and the like in addition to establishment, change, and release of an RB, a change, a release, and the like of a secondary cell in LTE described in NPL 4. In addition, in the MR-DC, particularly in E-UTRA-NR Dual Connectivity (EN-DC) and NG-RAN E-UTRA-NR Dual Connectivity (NGEN-DC), the RRC connection reconfiguration procedure is used not only in LTE but also in NR to perform a part of handover, measurement, and the like in addition to a part of establishing, changing, and releasing of a RB and changing, releasing, and the like of a secondary cell in NR, which is described in NPL 10. The EN-DC is a case of MR-DC in which the core network is the EPC 104, and the master node is the eNB 102. The NGEN-DC is a case of MR-DC in which the core network is 5GC 110 and the master node is the eNB 102. In an embodiment of the present invention, although the procedure used for establishing, changing, and releasing of the RB and adding, changing, releasing, handover, measurement, and the like of the cell group in the NR is referred to as an RRC connection reconfiguration procedure, a different designation may be used. In addition, in an embodiment of the present invention, the procedure of establishing, changing, and releasing of the RB and adding, changing, releasing, handover, measurement, and the like of the cell group may be a procedure in the NR described in NPL 10 and may be designated as an RRC reconfiguration procedure.

In the RRC connection reconfiguration procedure, the UE 122 receives an RRC Connection Reconfiguration message (RRCConnectionReconfigration) from the eNB 102 (step S400) and performs processing of various configurations, for example, configuration of the DRB and the like based on information included in the RRC connection reconfiguration message (Step S402). After Step S402, the UE 122 may transmit an RRC connection reconfiguration completion message (RRCConnectionReconfigrationComplete) to the eNB 102 (not illustrated).

Figure 5:
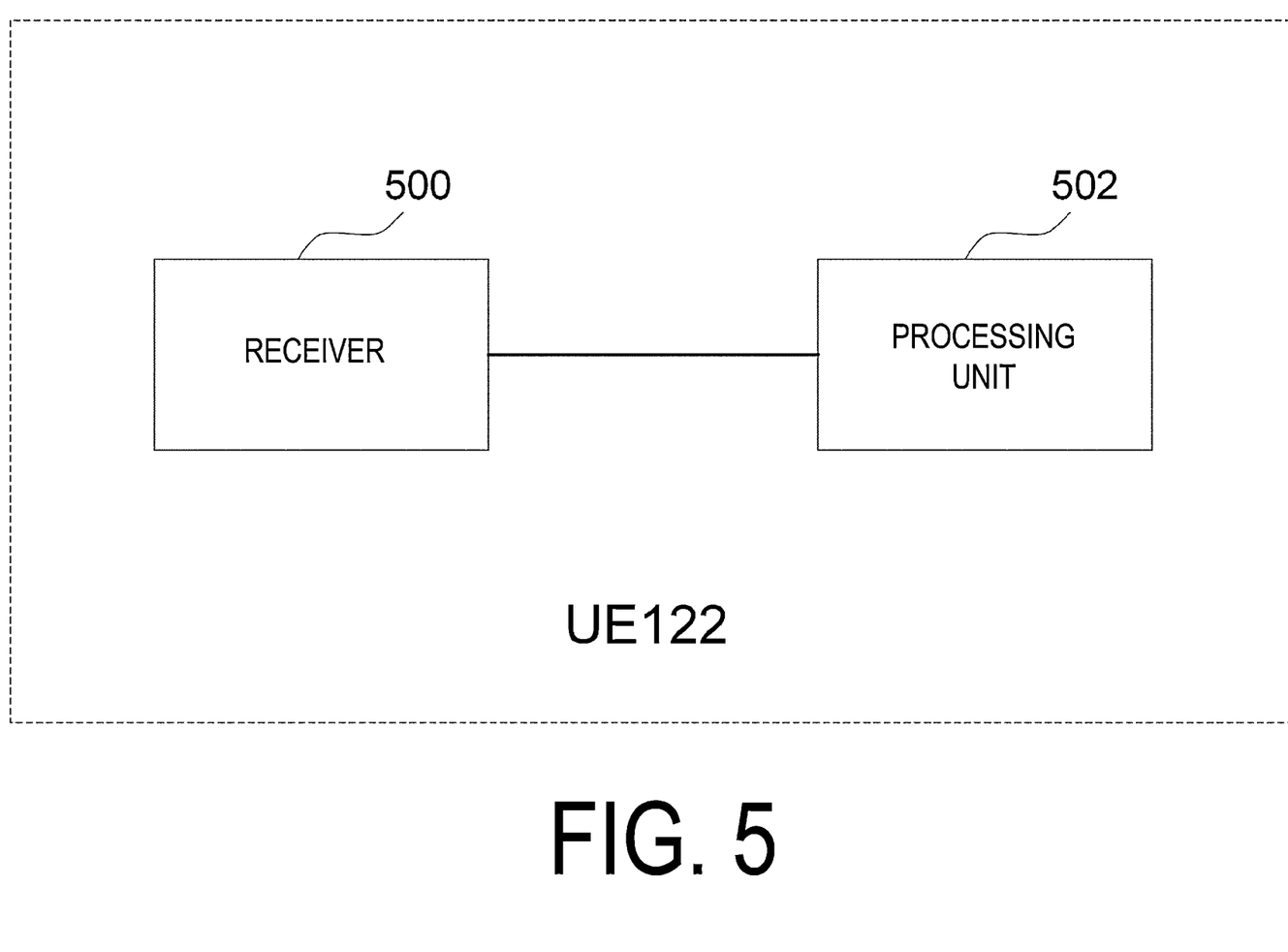
FIG. 5 is a block diagram illustrating a configuration of a terminal apparatus according to an embodiment of the present invention.

FIG. 5 is a block diagram illustrating a configuration of the terminal apparatus (UE 122) according to an embodiment of the present invention. Note that FIG. 5 illustrates only the main components closely related to the present invention in order to avoid complexity of description.

The UE 122 illustrated in FIG. 5 includes a receiver 500 configured to receive an RRC connection reconfiguration message from the eNB 102 and a processing unit 502 configured to process a message.

Figure 6:
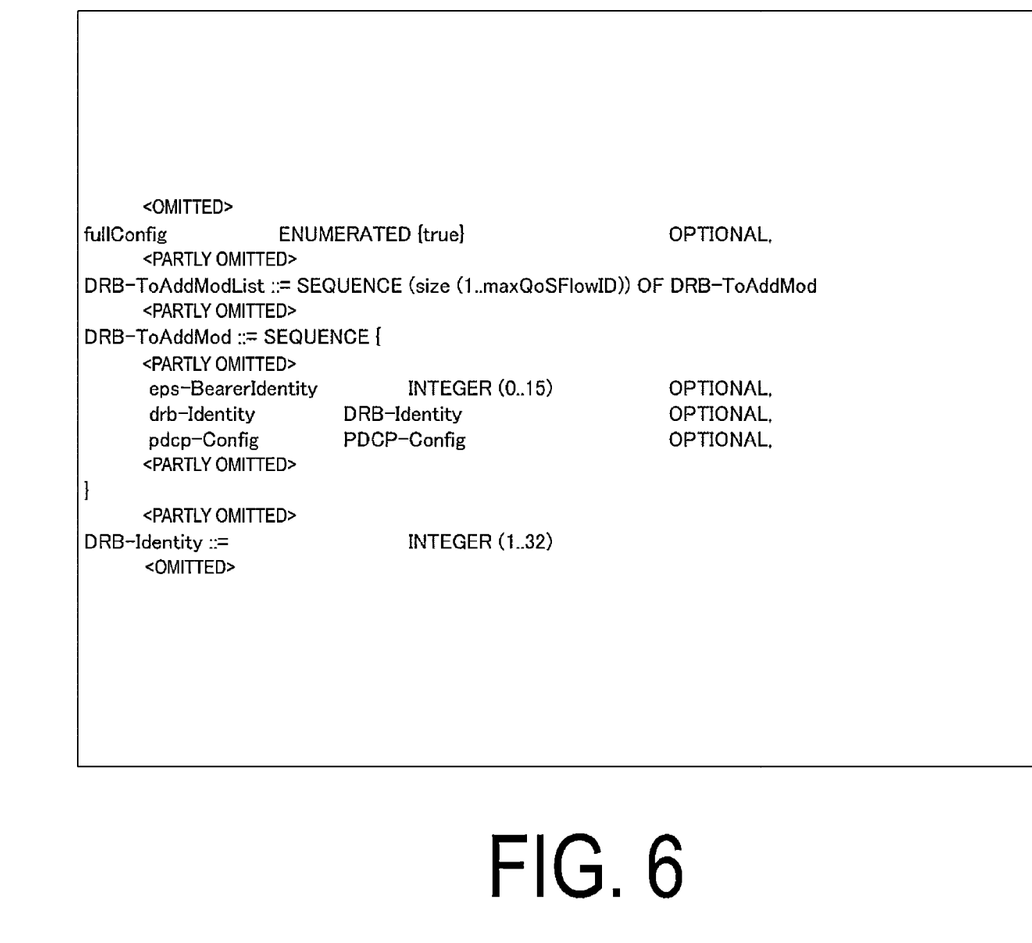
FIG. 6 is an example of information relating to a DRB configuration and an Abstract Syntax Notation One (ASN.1) description of information according to an embodiment of the present invention.

FIG. 6 is one example of information relating to LTE in a DRB configuration for a cell group of a master node in the EN-DC and the NGEN-DC, the DRB configuration being part of information included in the RRC connection reconfiguration message illustrated in FIG. 4 and an Abstract Syntax Notation One (ASN.1) description of information. In the 3GPP, in the specifications relating to the RRC (NPL 4 and NPL 10), a message, information (Information Element: IE), and the like relating to the RRC are described using ASN.1. In the example of ASN.1 illustrated in FIG. 6, <omitted> and <partly omitted> are not part of the notation of ASN.1 and mean that other information is omitted. Note that there may also be omitted information in a part where neither <omitted> nor <partly omitted> is indicated. In addition, the example of ASN.1 illustrated in FIG. 6 does not correctly follow the ASN.1 notation method but is an example notation of parameters for the DRB configuration according to the present invention, and other designations and other notations may be used. In addition, in order to avoid complexity of description, the example of ASN.1 illustrated in FIG. 6 represents only an example relating to main information that is closely related to the present invention.

Information denoted by fullConfig in FIG. 6 is information for indicating that a full configuration is applied, and the application of the full configuration may be indicated using true, enable, or the like. Information denoted by DRB-ToAddModList may be a list of information for indicating a configuration of the DRB to be added or changed that is denoted by DRBToAddMod. Information denoted by eps-BearerIdentity included in DRB-ToAddMod (the information for indicating a configuration of the DRB to be added or changed) may be information of an EPS bearer identity for identifying an EPS bearer described in NPL 3. In the example illustrated in FIG. 6, although eps-BearerIdentity is configured to be an integer value in the range of 0 to 15, other values may be configured. The information of the EPS bearer identity may correspond to the DRB to be configured on a one-to-one basis. Information denoted by DRB-Identity included in the information for indicating the configuration of the DRB to be added or changed is information of the DRB identity of the DRB to be added or changed. In the example illustrated in FIG. 6, DRB-Identity is configured to be an integer value in the range of 1 to 32, other values may be configured. Information denoted by pdcp-Config included in the information for indicating the configuration of the DRB to be added or changed may be information relating to a configuration of an LTE PDCP entity for establishing or changing the PDCP 206.

Some or all of the information illustrated in FIG. 6 may be optional. In other words, the information illustrated in FIG. 6 may be included in an RRC connection reconfiguration message when necessary. For example, in a case that an LTE PDCP is used as the PDCP of the DRB in the UE 122 corresponding to EN-DC, information relating to a configuration of the LTE PDCP entity may be included. In a case that an NR PDCP is used, information relating to the LTE PDCP entity may not be included.

In the UE 122, the configuration of the PDCP entity is configured using a corresponding RRC entity. In other words, the configuration of an LTE PDCP entity is configured using an RRC entity for LTE described in NPL 4, and the configuration of an NR PDCP entity is configured using an RRC entity for NR described in NPL 10. In addition, in a process performed by the RRC entity for LTE, whether the LTE PDCP is established or configured is determined. In a process performed by the RRC entity for NR, whether the NR PDCP is established or configured is determined. In a case that information of a configuration relating to NR such as information relating to the configuration of the NR PDCP entity is included in an RRC connection reconfiguration message received from the eNB 102 in the form of a container or the like, the UE 122 decodes the information using the RRC entity for NR and performs configuration.

Hereinafter, in this embodiment, the information relating to the configuration of the DRB to be added or changed may be referred to as a DRB configuration, the information of the EPS bearer identity may be referred to as an EPS bearer identity, the information of the DRB identity may be referred to as a DRB identity, and the information relating to the configuration of the LTE PDCP entity may be referred to as an LTE PDCP configuration.

Figure 7:
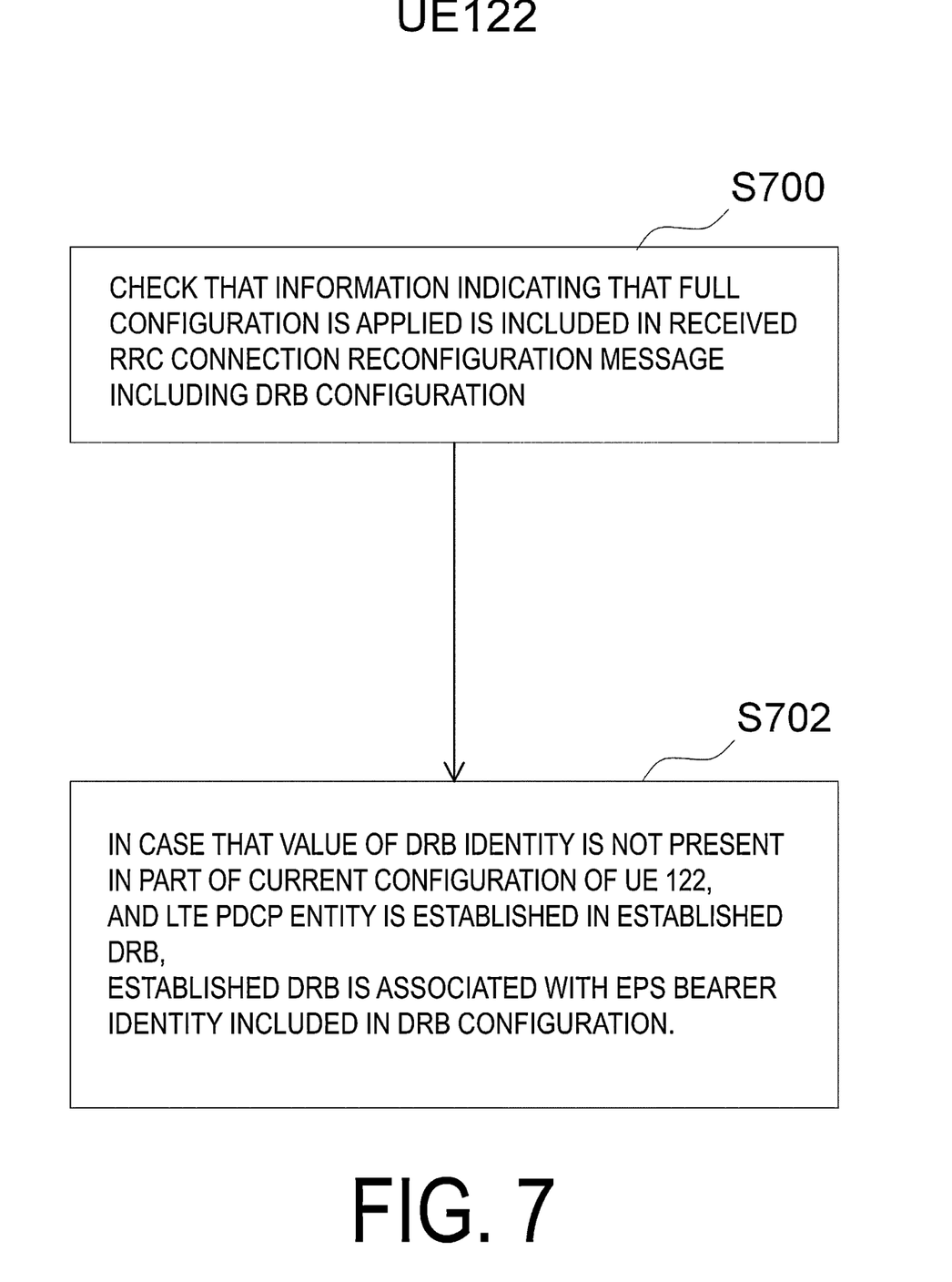
FIG. 7 illustrates an example of a processing method according to an embodiment of the present invention.
Figure 8:
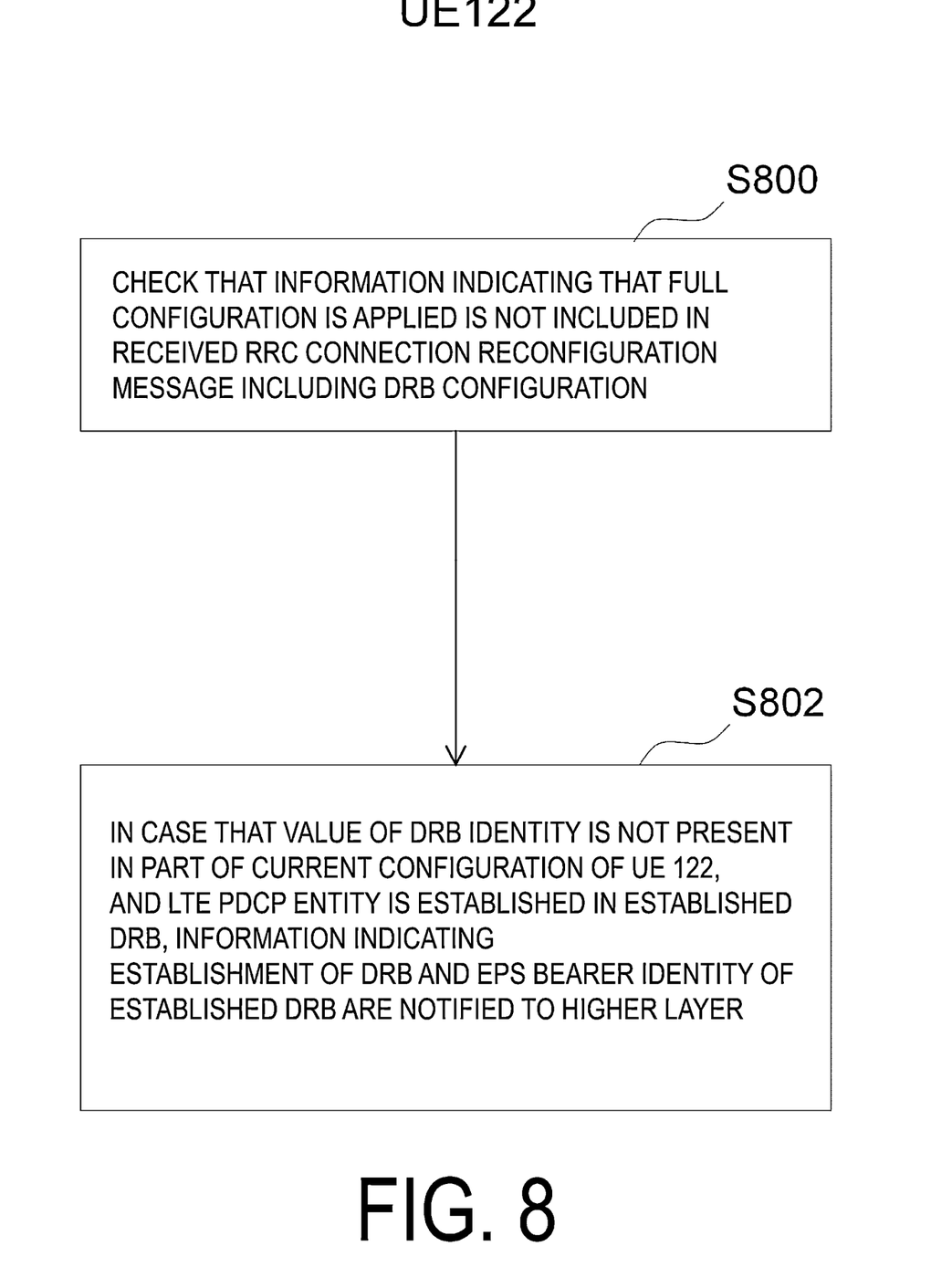
FIG. 8 is another example of a processing method according to an embodiment of the present invention.

FIG. 7 illustrates an example of a processing method using the processing unit 502 of the UE 122 illustrated in FIG. 5 according to an embodiment of the present invention, and FIG. 8 illustrates another example of a processing method using the processing unit 502 of the UE 122 illustrated in FIG. 5 according to an embodiment of the present invention. In description presented below, DRB configurations are included in a list of the DRB configuration, and processing for the DRB configuration in the processing unit 502 of the UE 122 is performed for each DRB configuration included in the list of the DRB configuration.

An example of a DRB configuration procedure will be described with reference to FIGS. 5 to 7.

The processing unit 502 of the UE 122 checks that information indicating that a full configuration is applied is included in an RRC connection reconfiguration message including the DRB configuration received from the receiver 500 (step S700).

Next, in a case that a value of the DRB identity included in the DRB configuration is not present in a part of the current configuration of the UE 122, and an LTE PDCP entity is established in an established DRB having the DRB identity, the processing unit 502 of the UE 122 associates the established DRB with the EPS bearer identity (step S702). In a case that a value of the DRB identity included in the DRB configuration is not present in a part of the current configuration of the UE 122, and an LTE PDCP entity is not established in an established DRB having the DRB identity, the processing unit 502 of the UE 122 does not associate the established DRB with the EPS bearer identity. "A case that an LTE PDCP entity is established in an established DRB having the DRB identity" described above may be replaced with "a case that a PDCP entity is established using LTE in an established DRB having the DRB identity" or may be replaced with "a case that an LTE PDCP entity configuration is included in the DRB configuration". "A case that an LTE PDCP entity is established" represents a case that a PDCP entity is established in an RRC entity for LTE, and "an LTE PDCP configuration is included in a DRB configuration" indicates that a PDCP configuration is included in the DRB configuration of an RRC entity for LTE. "A case that an LTE PDCP entity has not been established in an established DRB having the DRB identity" described above may be replaced with "a case that a PDCP entity is not established using LTE in an established DRB having the DRB identity" or may be replaced with "a case that an LTE PDCP entity configuration is not included in the DRB configuration". "A case that an LTE PDCP entity is not established" represents a case that a PDCP entity is not established in an RRC entity for LTE, and "an LTE PDCP configuration is not included in the DRB configuration" indicates that a PDCP configuration is not included in the DRB configuration of an RRC entity for LTE.

Each of pieces of information may be checked according to a different order from the order in FIG. 7. The checking of inclusion of information indicating that a full configuration is applied may be performed after checking that a value of information of the DRB identity is not present in a part of the current configuration of the UE 122 or checking that an LTE PDCP entity is established in Step S702.

Next, another example of the DRB configuration procedure will now be described with reference to FIG. 5, FIG. 6, and FIG. 8.

The processing unit 502 of the UE 122 checks that information indicating that a full configuration is applied is not included in an RRC connection reconfiguration message including the DRB configuration received from the receiver 500 (step S800).

Next, in a case that a value of the DRB identity included in the DRB configuration is not present in a part of the current configuration of the UE 122, and an LTE PDCP entity is established in an established DRB having the DRB identity, the processing unit 502 of the UE 122 notifies a higher layer of information indicating that the DRB is established and the EPS bearer identity of the established DRB (step S802). In a case that a value of the DRB identity included in the DRB configuration is not present in a part of the current configuration of the UE 122, and an LTE PDCP entity is not established in an established DRB having the DRB identity, the processing unit 502 of the UE 122 does not notify a higher layer of information indicating that the DRB is established and the EPS bearer identity of the established DRB. "A case that an LTE PDCP entity is established in an established DRB having the DRB identity" described above may be replaced with "a case that a PDCP entity has been established using LTE in an established DRB having the DRB identity" or may be replaced with "a case that an LTE PDCP entity configuration is included in the DRB configuration". "A case that an LTE PDCP entity is established" represents a case that a PDCP entity is established in an RRC entity for LTE, and "an LTE PDCP configuration is included in the DRB configuration" indicates that a PDCP configuration is included in the DRB configuration of an RRC entity for LTE. "A case that an LTE PDCP entity is not established in an established DRB having the DRB identity" described above may be replaced with "a case in a PDCP entity is not established using LTE in an established DRB having the DRB identity" or may be replaced with "a case that an LTE PDCP entity configuration is not included in the DRB configuration". "A case that an LTE PDCP entity is not established" represents a case that a PDCP entity is not established in an RRC entity for LTE, and "an LTE PDCP configuration is not included in the DRB configuration" indicates that a PDCP configuration is not included in the DRB configuration of an RRC entity for LTE.

Each of pieces of information may be checked according to a different order from the order in FIG. 8. The checking of non-inclusion of information indicating that a full configuration is applied may be performed after checking that a value of the information of the DRB identity is not present in a part of the current configuration of the UE 122 or after checking that an LTE PDCP entity is established in step S802.

According to an embodiment of the present invention, the terminal apparatus can efficiently perform communication by reducing complexity of protocol processing.

The DRB configuration according to an embodiment of the present invention may be included not only in the RRC connection reconfiguration procedure but also in an RRC establishment procedure or an RRC re-establishment procedure.

In the embodiment of the present invention, although "LTE PDCP" is described, in a case that the PDCP is definitely a PDCP configured in an RRC entity for LTE described in NPL 4, "PDCP" may be used without attaching the term LTE thereto.

A program operating on an apparatus according to the present invention may serve as a program that controls a Central Processing Unit (CPU) and the like to cause a computer to operate in such a manner as to realize the functions of the above-described embodiments according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiments may be partially enabled by a computer. In such a case, a program for realizing such control functions may be recorded on a computer-readable recording medium to cause a computer system to read the program recorded on the recording medium to perform the program. It is assumed that the "computer system" mentioned here refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may include a digital circuit, or may include an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

Supplement

A terminal apparatus according to aspect 1 of the present invention is a terminal apparatus that communicates with one or multiple base station apparatuses, the terminal apparatus including: a receiver configured to receive an RRC connection reconfiguration message including a DRB configuration from a base station apparatus of the one or multiple base station apparatuses; and a processing unit configured to associate a DRB that is established with an EPS bearer identity included in information of a DRB configuration in a case that information indicating that a full configuration is applied is included in the RRC connection reconfiguration message received by the receiver, a DRB identity included in the information of the DRB configuration is not present in a part of a current configuration of the terminal apparatus, and an LTE PDCP entity is established in the DRB that is established and has the DRB identity.

A terminal apparatus according to aspect 2 of the present invention is a terminal apparatus that communicates with one or multiple base station apparatuses, the terminal apparatus including: a receiver configured to receive an RRC connection reconfiguration message including a DRB configuration from a base station apparatus of the one or multiple base station apparatuses; and a processing unit configured to notify a higher layer of information indicating establishment of a DRB and an EPS bearer identity of the DRB that is established in a case that information indicating that a full configuration is applied is not included in the RRC connection reconfiguration message received by the receiver, a DRB identity included in the information of the DRB configuration is not present in a part of a current configuration of the terminal apparatus, and an LTE PDCP entity is established in the DRB that is established and has the DRB identity.

A terminal apparatus according to aspect 3 of the present invention is a terminal apparatus that communicates with a base station apparatus of E-UTRA and a base station apparatus of NR by using MR-DC, the terminal apparatus including: a receiver configured to receive an RRC connection reconfiguration message including a DRB configuration from a base station apparatus of the base station apparatuses; and a processing unit configured to associate a DRB that is established with an EPS bearer identity included in information of a DRB configuration in a case that information indicating that a full configuration is applied is included in the RRC connection reconfiguration message received by the receiver, a DRB identity included in the information of the DRB configuration is not present in a part of a current configuration of the terminal apparatus, and an LTE PDCP entity is established in the DRB that is established and has the DRB identity.

A terminal apparatus according to aspect 4 of the present invention is a terminal apparatus that communicates with a base station apparatus of E-UTRA and a base station apparatus of NR by using MR-DC, the terminal apparatus including: a receiver configured to receive an RRC connection reconfiguration message including a DRB configuration from a base station apparatus of the base station apparatuses; and a processing unit configured to notify a higher layer of information indicating establishment of a DRB and an EPS bearer identity of the DRB that is established in a case that information indicating that a full configuration is applied is not included in the RRC connection reconfiguration message received by the receiver, a DRB identity included in the DRB configuration is not present in a part of a current configuration of the terminal apparatus, and an LTE PDCP entity is established in the DRB that is established and has the DRB identity.

A method according to aspect 5 of the present invention is a method performed by a terminal apparatus that communicates with one or multiple base station apparatuses, the method including: receiving an RRC connection reconfiguration message including a DRB configuration from a base station apparatus of the one or multiple base station apparatuses; and associating a DRB that is established with an EPS bearer identity included in information of a DRB configuration in a case that information indicating that a full configuration is applied is included in the RRC connection reconfiguration message received by the receiver, a DRB identity included in the information of the DRB configuration is not present in a part of a current configuration of the terminal apparatus, and an LTE PDCP entity is established in the DRB that is established and has the DRB identity.

A terminal apparatus according to aspect 6 of the present invention is a terminal apparatus that communicates with one or multiple base station apparatuses, the terminal apparatus including: a receiver configured to receive a Radio Resource Control (RRC) connection reconfiguration message including a Data Radio Bearer (DRB) configuration from a base station apparatus of the one or multiple base station apparatuses; and a processing unit configured to notify a higher layer of information indicating that a DRB having a DRB identity is established and an EPS bearer identity of the DRB established, based on the fact that the DRB identity included in the DRB configuration is not configured in the terminal apparatus, and an Evolved Universal Terrestrial Radio Access (E-UTRA) Packet Data Convergence Protocol (PDCP) entity configuration is included in the DRB configuration.

A base station apparatus according to aspect 7 of the present invention is a base station apparatus that communicates with a terminal apparatus, the base station apparatus including: a generation unit configured to generate a Radio Resource Control (RRC) connection reconfiguration message including a Data Radio Bearer (DRB) configuration; and a transmitter configured to transmit the RRC connection reconfiguration message to the terminal apparatus, in which the RRC connection reconfiguration message is a message that causes the terminal apparatus to notify, from a lower layer to a higher layer, information indicating that a DRB having a DRB identity is established, and an EPS bearer identity of the established DRB, based on the fact that the DRB identity included in the DRB configuration is not configured in the terminal apparatus, and an Evolved Universal Terrestrial Radio Access (E-UTRA) Packet Data Convergence Protocol (PDCP) entity configuration is included in the DRB configuration.

A method according to aspect 8 of the present invention is a method performed by a terminal apparatus that communicates with one or multiple base station apparatuses, the method including: receiving a Radio Resource Control (RRC) connection reconfiguration message including a Data Radio Bearer (DRB) configuration from a base station apparatus of the one or multiple base station apparatuses; and notifying a higher layer of information indicating that a DRB having a DRB identity is established and an EPS bearer identity of the DRB established, based on the fact that the DRB identity included in the DRB configuration is not configured in the terminal apparatus, and an Evolved Universal Terrestrial Radio Access (E-UTRA) Packet Data Convergence Protocol (PDCP) entity configuration is included in the DRB configuration.

A method according to aspect 9 of the present invention is a method performed by a base station apparatus that communicates with a terminal apparatus, the method including: generating a Radio Resource Control (RRC) connection reconfiguration message including a Data Radio Bearer (DRB) configuration; and transmitting the RRC connection reconfiguration message to the terminal apparatus, in which the RRC connection reconfiguration message is a message that causes the terminal apparatus to notify, from a lower layer to a higher layer, information indicating that a DRB having a DRB identity is established, and an EPS bearer identity of the DRB established, based on the fact that the DRB identity included in the DRB configuration is not configured in the terminal apparatus, and an Evolved Universal Terrestrial Radio Access (E-UTRA) Packet Data Convergence Protocol (PDCP) entity configuration is included in the DRB configuration.

These comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. In addition, a configuration in which components, which are described in the embodiment described above, having similar effects are interchanged is also included in the present invention.

CROSS-REFERENCE OF RELATED APPLICATION

This application claims the benefit of priority to Japanese Unexamined Patent Application No. 2017-219899 filed on Nov. 15, 2017, which is incorporated herein by reference in its entirety.

REFERENCE SIGNS LIST

100 E-UTRA
102 eNB
104 EPC
106 NR
108 gNB
110 5GC
112, 114, 116, 118, 120, 124 Interface
122 UE
200, 300 PHY
202, 302 MAC
204, 304 RLC
206, 306 PDCP
208, 308 RRC
310 SDAP
500 Receiver
502 Processing unit

The invention claimed is:

1. A terminal apparatus for communicating with one or multiple base station apparatuses, the terminal apparatus comprising:
processing circuitry; and
a receiver configured to receive a Radio Resource Control (RRC) connection reconfiguration message including, for a Data Radio Bearer (DRB) associated with a DRB identity, a New Radio (NR) Packet Data Convergence Protocol (PDCP) entity configuration or an Evolved Universal Terrestrial Radio Access (E-UTRA) PDCP entity configuration, from a base station apparatus of the one or multiple base station apparatuses, wherein
the processing circuitry is configured to notify a higher layer of information indicating that the DRB is established and an EPS bearer identity of the DRB established, based on a determination that both of the following conditions hold: a) the DRB identity is not currently configured in the terminal apparatus, and b) the E-UTRA PDCP entity configuration for the DRB is included in a DRB configuration included in the RRC connection reconfiguration message.

2. A base station apparatus for communicating with a terminal apparatus, the base station apparatus comprising:
generation circuitry configured to generate a Radio Resource Control (RRC) connection reconfiguration message including, for a Data Radio Bearer (DRB) associated with a DRB identity, a New Radio (NR) Packet Data Convergence Protocol (PDCP) entity configuration or an Evolved Universal Terrestrial Radio Access (E-UTRA) PDCP entity configuration; and
a transmitter configured to transmit the RRC connection reconfiguration message to the terminal apparatus, wherein
the RRC connection reconfiguration message is a message that causes the terminal apparatus to:
notify a higher layer of information indicating that the DRB is established and an EPS bearer identity of the DRB established, based on a determination that both of the following conditions hold: a) the DRB identity is not currently configured in the terminal apparatus, and b) the E-UTRA PDCP entity configuration for the DRB is included in a DRB configuration included in the RRC connection reconfiguration message.

3. A method performed at a terminal apparatus that is configured to communicate with one or multiple base station apparatuses, the method comprising:
receiving a Radio Resource Control (RRC) connection reconfiguration message including, for a Data Radio Bearer (DRB) associated with a DRB identity, a New Radio (NR) Packet Data Convergence Protocol (PDCP) entity configuration or an Evolved Universal Terrestrial Radio Access (E-UTRA) PDCP entity configuration, from a base station apparatus of the one or multiple base station apparatuses; and
notifying a higher layer of information indicating that the DRB is established and an EPS bearer identity of the DRB established, based on a determination that both of the following conditions hold: a) the DRB identity is not currently configured in the terminal apparatus, and b) the E-UTRA PDCP entity configuration for the DRB is included in a DRB configuration included in the RRC connection reconfiguration message.

4. A method performed at a base station apparatus that is configured to communicate with a terminal apparatus, the method comprising:
generating a Radio Resource Control (RRC) connection reconfiguration message including, for a Data Radio Bearer (DRB) associated with a DRB identity, a New Radio (NR) Packet Data Convergence Protocol (PDCP) entity configuration or an Evolved Universal Terrestrial Radio Access (E-UTRA) PDCP entity configuration; and
transmitting the RRC connection reconfiguration message to the terminal apparatus, wherein
the RRC connection reconfiguration message is a message that causes the terminal apparatus to:
notify a higher layer of information indicating that the DRB is established and an EPS bearer identity of the DRB established, based on a determination that both of the following conditions hold: a) the DRB identity is not currently configured in the terminal apparatus, and b) the E-UTRA PDCP entity configuration for the DRB is included in a DRB configuration included in the RRC connection reconfiguration message.

* * * * *